United States Patent
Lee et al.

(10) Patent No.: US 9,456,152 B2
(45) Date of Patent: Sep. 27, 2016

(54) DEVICE AND METHOD FOR BLUR PROCESSING

(75) Inventors: Seung Kyu Lee, Yongin (KR); Byong Min Kang, Yongin (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 578 days.

(21) Appl. No.: 13/823,557

(22) PCT Filed: Jul. 11, 2012

(86) PCT No.: PCT/KR2012/005512
§ 371 (c)(1),
(2), (4) Date: May 10, 2013

(87) PCT Pub. No.: WO2013/009099
PCT Pub. Date: Jan. 17, 2013

(65) Prior Publication Data
US 2013/0242111 A1    Sep. 19, 2013

(30) Foreign Application Priority Data

Jul. 11, 2012 (KR) .................. 10-2012-0075386

(51) Int. Cl.
G06K 9/40    (2006.01)
H04N 5/357   (2011.01)
G01S 17/89   (2006.01)
G06T 5/00    (2006.01)
G01S 17/10   (2006.01)
G01S 7/486   (2006.01)
G01S 7/497   (2006.01)

(52) U.S. Cl.
CPC ............ H04N 5/357 (2013.01); G01S 7/4865 (2013.01); G01S 7/497 (2013.01); G01S 17/10 (2013.01); G01S 17/89 (2013.01); G06T 5/003 (2013.01); *G06T 2207/10028* (2013.01); *G06T 2207/30168* (2013.01)

(58) Field of Classification Search
USPC .......................................... 382/266
See application file for complete search history.

(56) References Cited

U.S. PATENT DOCUMENTS

| 4,586,029 A * | 4/1986 | Tamura ............... G03B 7/0807 340/540 |
| 7,042,507 B2 * | 5/2006 | Sato .................... H04N 5/2176 348/208.6 |
| 7,450,220 B2 | 11/2008 | O'Connor et al. |

(Continued)

FOREIGN PATENT DOCUMENTS

| CN | 101582165 A | 11/2009 |
| JP | 2007-271373 | 10/2007 |

(Continued)

OTHER PUBLICATIONS

Extended European Search Report dated Mar. 20, 2015 issued in corresponding European Application No. 12811416.2.

(Continued)

*Primary Examiner* — John Strege
(74) *Attorney, Agent, or Firm* — Harness, Dickey & Pierce, P.L.C.

(57) ABSTRACT

Provided is a blur processing method and apparatus that may determine whether a blur occurs in an image generated by a Time of Flight (ToF) camera, and may deblur a blur using a value of a normal adjacent pixel in which the blur is absent when the blur occurs.

20 Claims, 16 Drawing Sheets

(56) References Cited

U.S. PATENT DOCUMENTS

| | | | |
|---|---|---|---|
| 2006/0176469 A1 | 8/2006 | O'Connor et al. | |
| 2006/0241371 A1 | 10/2006 | Rafii et al. | |
| 2008/0036996 A1 | 2/2008 | O'Connor et al. | |
| 2009/0079959 A1 | 3/2009 | Masuda | |
| 2009/0135404 A1* | 5/2009 | Lamesch | G01S 7/481 356/5.01 |
| 2010/0201798 A1 | 8/2010 | Ren et al. | |
| 2010/0202666 A1* | 8/2010 | Ren | G06K 9/00604 382/117 |
| 2010/0246989 A1 | 9/2010 | Agrawal et al. | |
| 2010/0321510 A1 | 12/2010 | Tsutsumi | |
| 2011/0007072 A1 | 1/2011 | Khan et al. | |
| 2011/0051119 A1 | 3/2011 | Min et al. | |
| 2011/0304696 A1* | 12/2011 | Centen | G01S 17/89 348/46 |
| 2012/0248514 A1* | 10/2012 | Korekado | H01L 27/14812 257/292 |

FOREIGN PATENT DOCUMENTS

| | | |
|---|---|---|
| JP | 2008-164496 A | 7/2008 |
| JP | 2009-079987 A | 4/2009 |
| JP | 2009-079988 A | 4/2009 |
| JP | 2010-286488 A | 12/2010 |
| JP | 2011-022088 A | 2/2011 |
| JP | 2011-022089 A | 2/2011 |
| JP | 2011-053216 A | 3/2011 |
| KR | 10-2008-0077391 | 8/2008 |
| KR | 10-2009-0012998 | 2/2009 |
| KR | 10-2010-0079361 | 7/2010 |
| KR | 10-2011-0015452 | 5/2011 |

OTHER PUBLICATIONS

Lottner, O. et al. "Movement Artefacts in Range Images of Time-of-Flight Cameras." *Signals, Circuits and Systems*, ISSCS (2007), International Symposium on, IEEE.

Hussmann, Stephan et al. "Real-Time Motion Artifact Suppression in TOF Camera Systems." *IEEE Transactions on Instrumentation and Measurement* 60.5 (2011): 1682-1690.

Fernandes, Leandro A.F. and Manuel M. Oliveira. "Real-time line detection through an improved Hough transform voting scheme." *Pattern Recognition* 41 (2008): 299-314.

Lee, Seungkyu et al. "ToF Depth Image Motion Blur Detection Using 3D Blur Shape Models." *Computational Imaging X* SPIE 8296 (2012): 829615-1-829615-6.

International Search Report of Corresponding PCT Application PCT/KR2012/005512 mailed Dec. 14, 2012.

Japanese Patent Office Action dated Mar. 1, 2016 for JP Patent Application No. 2014-520126.

First Office Action issued by the State Intellectual Property Office of P.R. China dated Jul. 11, 2016 for corresponding CN Patent Application No. 201280003376.7.

* cited by examiner

DEVICE AND METHOD FOR BLUR PROCESSING

CROSS-REFERENCE TO RELATED APPLICATIONS

This application is a U.S. National Phase application of PCT/KR2012/005512 filed Jul. 11, 2012 and claims the foreign priority benefit of Korean Application No. 10-2012-0075386 filed Jul. 11, 2012 in the Korean Intellectual Property Office and U.S. Provisional Application No. 61/506,758 filed Jul. 12, 2011, the contents of each of which are incorporated herein by reference.

TECHNICAL FIELD

Example embodiments relate to a technology for deblurring a blur occurring in an image.

BACKGROUND ART

An image generated using a Time-of-Flight (ToF) camera may be acquired by calculating a phase difference between a radiated light signal, for example, an infrared signal, and a reflected light signal that may be reflected and returned by a subject, during an integration time for each frame. When the camera or the subject moves during a time period shorter than the integration time, a phase of the reflected light signal may change.

In this instance, depth information obtained through a corresponding reflected light signal may have an inaccurate value which may appear in a form of a blur in an image. Such a phenomenon may occur for a reason similar to a reason for a blur phenomenon occurring in a color camera. However, due to a difference in schemes of acquiring an image between the ToF camera and the color camera, the blur phenomenon occurring in the ToF camera may appear different from a blur phenomenon in a color image.

DISCLOSURE OF INVENTION

Technical Solutions

According to example embodiments, there is provided an apparatus for processing a blur, the apparatus including a control unit to generate a control signal, a sensor unit to integrate, based on the generated control signal, electrons generated by a reflected light signal corresponding to a radiated light signal reflected and returned from an object, and a blur determining unit to determine whether a blur occurs, based on a relationship between quantities of electrons integrated for each control signal.

The blur determining unit may determine whether a blur occurs, by comparing the relationship between the quantities of the integrated electrons to reference electric charge quantity relationship information indicating a case in which a blur is absent.

When the radiated light signal is emitted through a Time of Flight (ToF) camera, the blur determining unit may determine whether a blur occurs in an image acquired through the ToF camera, based on a phase difference of the reflected light signal.

The blur determining unit may calculate depth information by calculating a phase difference between the reflected light signal and a plurality of control signals having different phases.

The sensor unit may obtain a quantity of electric charges light-received by the reflected light signal, and each of a plurality of control signals having different phases, and the blur determining unit may determine whether a blur occurs in the acquired image, based on whether a relationship between the obtained quantity of electric charges, and each quantity of electric charges defined by the different phases of the plurality of control signals is out of a normal range.

In addition, the sensor unit may obtain n reflected light signals, and the blur determining unit may calculate n pieces of depth information by calculating a phase difference between a plurality of control signals having different phases, and the n reflected light signals, and may calculate an average value of the n pieces of depth information calculated. Here, n denotes a natural number.

The blur determining unit may determine that a blur occurs in the image when at least one of the n pieces of depth information calculated is not flat.

The apparatus may further include an image processing unit to deblur a blur in an image acquired through a ToF camera, by replacing a value of a pixel in which the blur occurs with a value of a normal adjacent pixel in which the blur is absent.

The image processing unit may replace depth information of a blurred area in which the blur occurs with the value of the normal adjacent pixel in which the blur is absent, based on a neighboring frame present at a time different from a time at which a frame in which the blur occurs, is present in the image.

According to other example embodiments, there is also provided an apparatus for processing a blur, the apparatus including a model identifying unit to identify a blur model corresponding to a structure of a ToF camera, a searching unit to search for a pattern associated with the blur model in an image acquired through the ToF camera, and an image processing unit to deblur a blur in the acquired image, by filtering a blurred area in a found pattern.

The image processing unit may filter the blurred area in an R-Theta space.

According to still other example embodiments, there is also provided a method of processing a blur, the method including generating a plurality of control signals having different phases, integrating, based on the plurality of control signals generated, electrons generated by a reflected light signal corresponding to a radiated light signal reflected and returned from an object, and determining whether a blur occurs, based on a relationship between quantities of electrons integrated for each of the plurality of control signals.

The determining may include determining whether a blur occurs, by comparing the relationship between the quantities of the integrated electrons to reference electric charge quantity relationship information indicating a case in which a blur is absent.

When the radiated light signal is emitted through a ToF camera, the determining may include determining whether a blur occurs in an image acquired through the ToF camera, based on a phase difference of the reflected light signal.

The determining may include calculating depth information by calculating a phase difference between the reflected light signal and a plurality of control signals having different phases.

The determining may include calculating a phase difference between n obtained reflected light signals, and the plurality of control signals having different phases, and calculating n pieces of depth information, based on a result of the calculating of the phase difference, and calculating an average value of the n pieces of depth information calculated. Here, n denotes a natural number.

The method may further include deblurring a blur in an image acquired through a ToF camera, by replacing a value of a pixel in which the blur occurs with a value of a normal adjacent pixel in which the blur is absent.

The deblurring may include deblurring the blur by replacing depth information of a blurred area in which the blur occurs with the value of the normal adjacent pixel in which the blur is absent, based on a neighboring frame present at a time different from a time at which a frame in which the blur occurs, is present in the image.

According to yet other example embodiments, there is also provided a method of processing a blur, the method including identifying a blur model corresponding to a structure of a ToF camera, searching for a pattern associated with the blur model in an image acquired through the ToF camera, filtering a blurred area in which a blur occurs in a found pattern, and deblurring the blur in an image in which the blurred area is filtered.

The filtering may include filtering the blurred area in an R-Theta space.

Advantageous Effects

According example embodiments, whether a blur occurs in an image acquired through a Time of Flight (ToF) camera may be efficiently determined based on a relationship between a plurality of reflected light signals that is reflected from an object.

According to example embodiments, a blur occurring in an image may be deblurred readily, by replacing the blur with a value of a normal adjacent pixel in which a blur is absent.

BEST MODE FOR CARRYING OUT THE INVENTION

Figure 1:
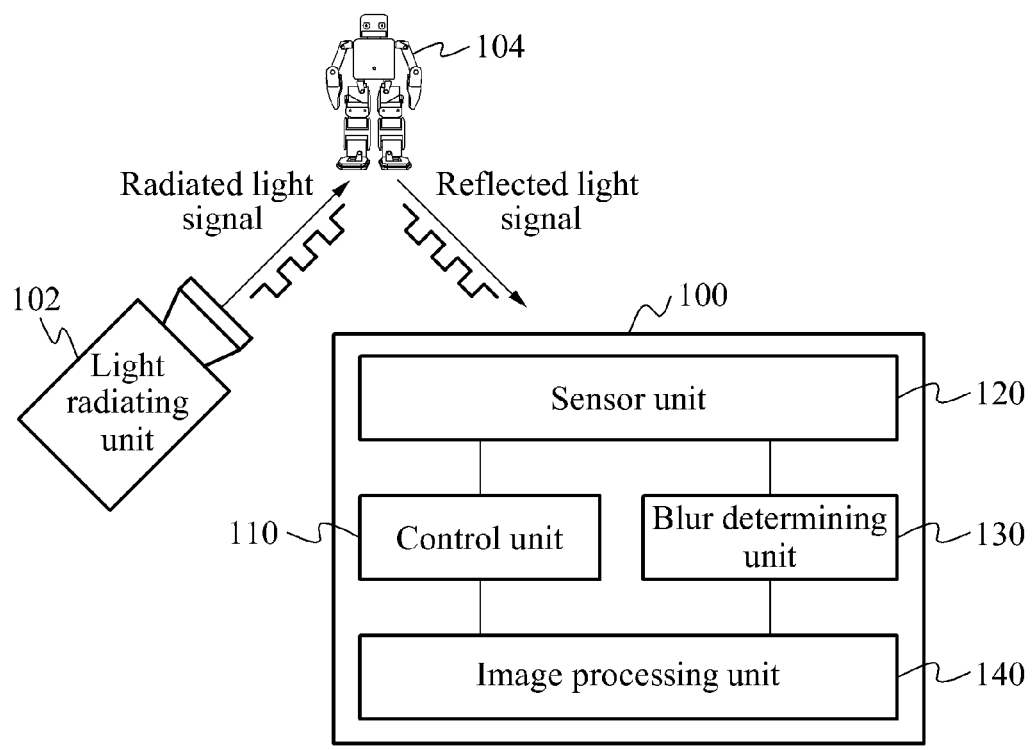
FIG. 1 is a block diagram illustrating an apparatus for processing a blur according to example embodiments.

Reference will now be made in detail to example embodiments, examples of which are illustrated in the accompanying drawings, wherein like reference numerals refer to the like elements throughout. Example embodiments are described below in order to explain example embodiments by referring to the figures.

FIG. 1 is a block diagram illustrating an apparatus for processing a blur according to example embodiments.

A blur processing apparatus 100 may include a control unit 110, a sensor unit 120, a blur determining unit 130, and an image processing unit 140.

The blur processing apparatus 100 of FIG. 1 may be implemented using a Time of Flight (ToF) camera. Depending on example embodiments, a light radiating unit 102 may be included in the ToF camera. The ToF camera may generate a depth image indicating a distance from the camera to an object 104, using a phase difference between a radiated light signal, for example an infrared signal, that is radiated to the object 104, and a reflected light signal corresponding to the radiated light signal that is reflected and returned from the object 104.

The light radiating unit 102 may radiate the radiated light signal to the object 104. The sensor unit 120 may sense the reflected light signal corresponding to the radiated light signal that is radiated by the light radiating unit 102, and reflected and returned from the object 104. For example, the sensor unit 110 may include a light sensing device, for example, a pinned photo diode (PPD), a photogate, a charge coupled device (CCD), and the like. Here, the object 104 may refer to a subject that is a target to be photographed.

The control unit 110 may generate a plurality of control signals having different phases. A control signal may refer to a signal that controls a timing for integrating electrons generated by sensing a reflected light signal.

A relationship between the control signal and the sensing unit 120 will be described with reference to FIGS. 2 and 3.

Figure 2:
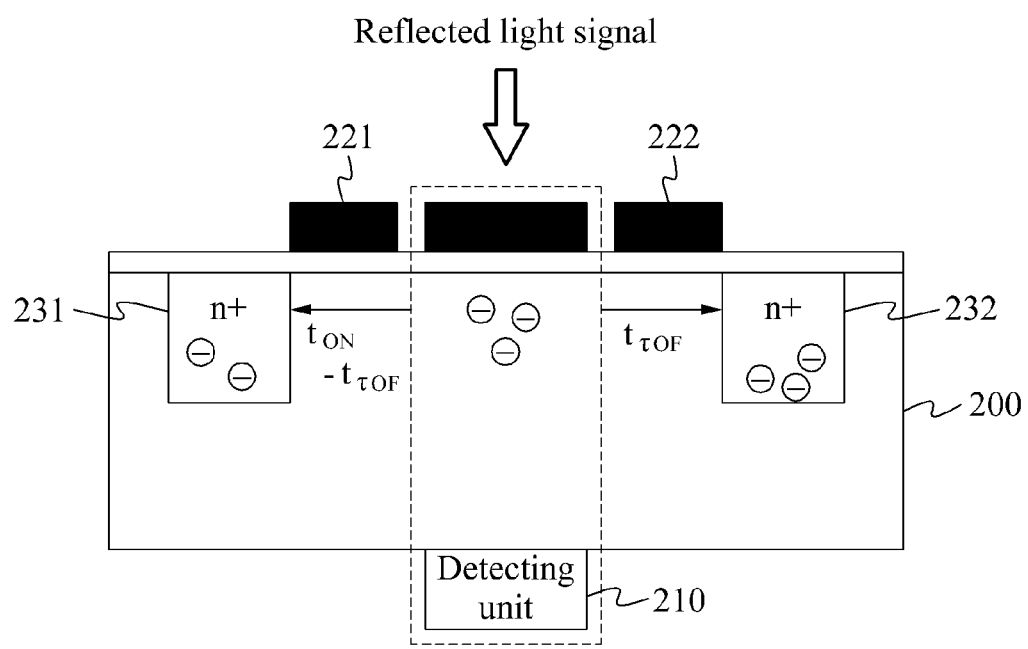
FIG. 2 is a diagram illustrating a pixel constituting a sensor unit according to example embodiments.

FIG. 2 is a diagram illustrating a pixel constituting a sensor unit according to example embodiments.

A pixel 200 may include a detecting unit 210, for example a photogate, a gate A 221, a gate B 222, an integrating unit 231, and an integrating unit 232. The detecting unit 210 may generate electrons by receiving a reflected light signal. The gate A 221 and the gate B 222 may transfer the electrons generated by the detecting unit 210 to the integrating unit 231 and the integrating unit 232, respectively. In FIG. 2, a plurality of gates, for example the gate A 221 and the gate B 222, may be provided to selectively transfer electrons to a plurality of different integrating units 231 and 232 based on a control signal.

The integrating unit 231 or the integrating unit 232 may integrate the transferred electrons. A time or a cycle for integrating electrons may be defined in advance. For example, the integrating unit 231 or the integrating unit 232 may be defined to integrate electrons during a predetermined time period, to emit the electrons when a quantity of the integrated electrons is calculated, and to integrate electrons again at a subsequent timing for integrating electrons.

A gate may be controlled to be turned ON or OFF by the control signal described above.

Figure 3:
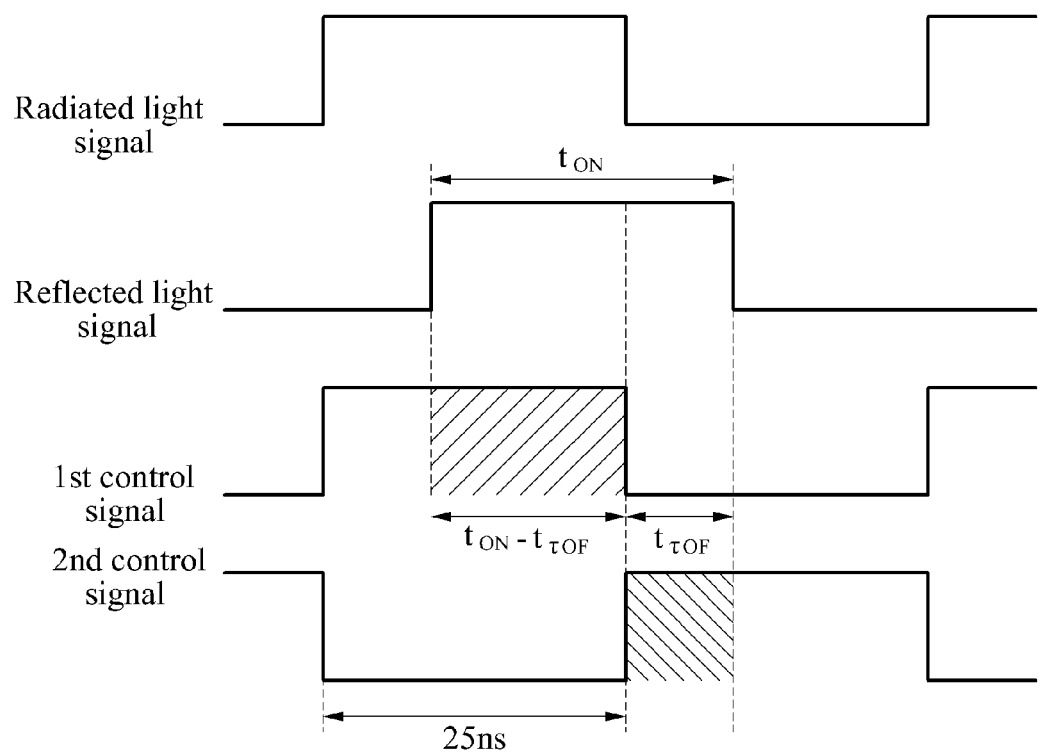
FIG. 3 is a timing diagram between a reflected light signal and control signals according to example embodiments.

FIG. 3 is a timing diagram between a reflected light signal and control signals according to example embodiments.

A first control signal and a second signal may control the gate A 221 and the gate B 222 of FIG. 2, respectively, and may have a phase difference of 180 degrees from each other. A half cycle of the first control signal or the second signal may correspond to, for example, 25 nanoseconds (ns).

As shown in FIG. 3, electrons may be generated by the detecting unit 210, during a time period $t_{ON}$ during which a reflected light signal has a high value.

In this instance, a portion of the generated electrons may pass through the gate A 221 to be integrated by the integrating unit 231 during a time period $t_{ON}$-$t_{TOF}$ during which the first control signal associated with the gate A 221 has a high value.

Conversely, a remaining portion of the generated electrons may pass through the gate B 222 to be integrated by the integrating unit 232 during a time period $t_{TOF}$ during which a value of the first control signal changes to a low value, and the second control signal associated with the gate B 222 has a high value.

For example, electrons generated during the time period $t_{ON}$ during which the reflected light signal has a high value may be transferred to the integrating unit 231 associated with the gate A 221 since the gate A 221 may be turned ON during the time period $t_{ON}$-$t_{TOF}$, and may be transferred to the integrating unit 232 associated with the gate B 222 since the gate B 222 may be turned ON during the time period $t_{TOF}$.

Although it is described that two gates and two integrating units are provided with respect to FIGS. 2 and 3, a number of gates and a number of integrating units may vary depending on example embodiments.

Referring to FIG. 1, the blur determining unit 130 may determine whether a blur occurs, based on a relationship between quantities of electrons integrated for each of the plurality of control signals, hereinafter referred to as quantities of electric charges.

In addition, the blur determining unit 130 may obtain a phase difference between the reflected light signal and the radiated light signal, using the plurality of control signals having different phases. For example, the sensor unit 120 may repetitively obtain reflected light signals that are reflected and returned during an integration time of a ToF camera, whereby the blur determining unit 130 may obtain depth information based on the reflected light signals obtained.

Figure 4:
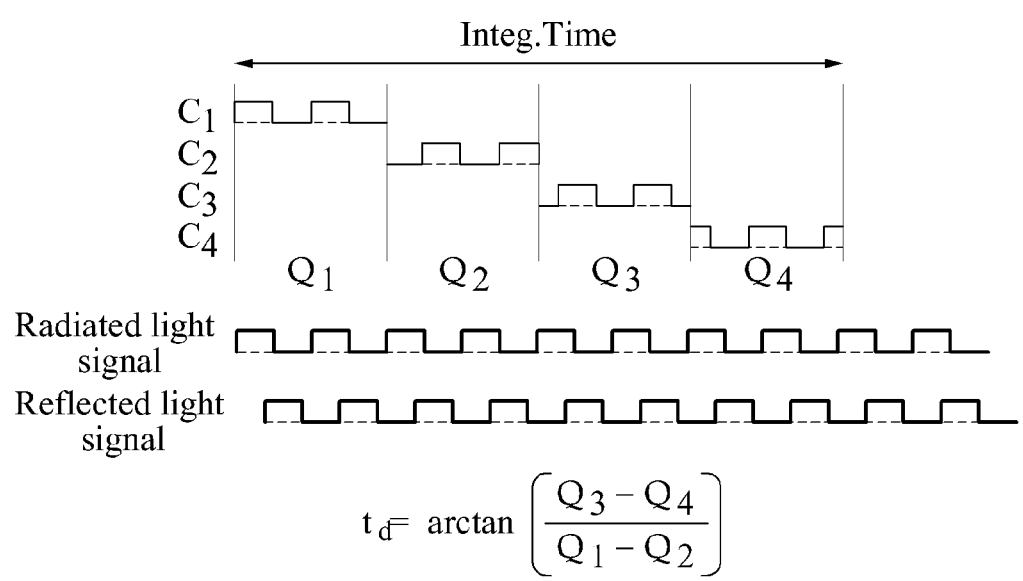
FIGS. 4 through 6 are diagrams illustrating examples of obtaining a reflected light signal for determining whether a blur occurs in an image according to example embodiments.
Figure 5:
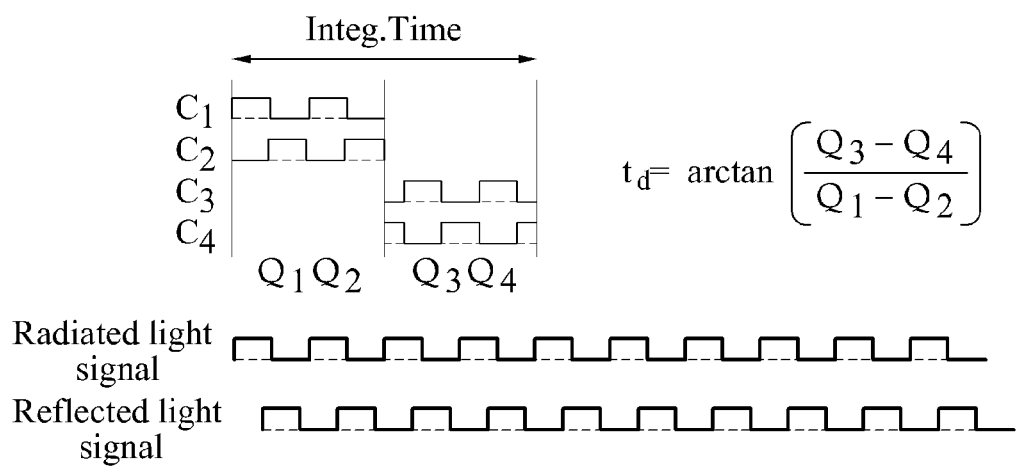
Figure 6:
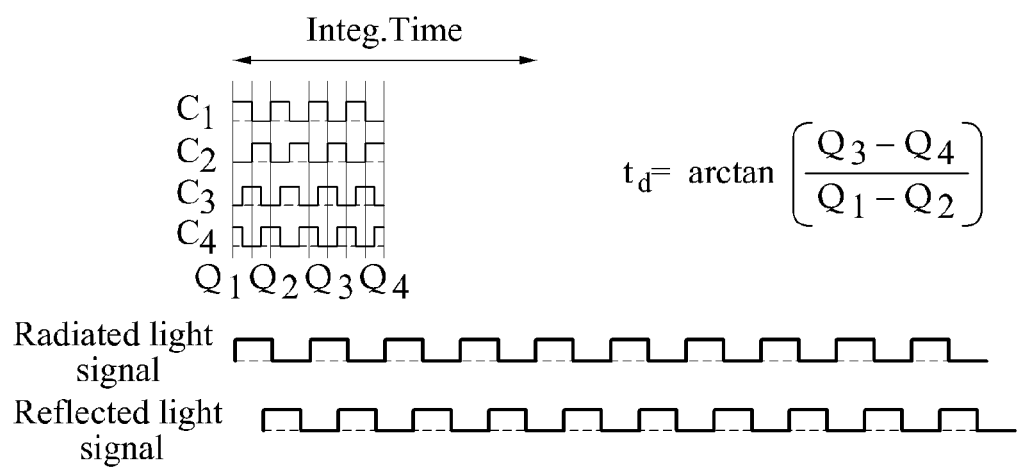

FIGS. 4 through 6 are diagrams illustrating examples of obtaining a reflected light signal for determining whether a blur occurs in an image according to example embodiments. In FIGS. 4 through 6, $C_1$ through $C_4$ denote control signals, $Q_1$ through $Q_4$ denote quantities of electric charges, and $t_d$ denotes depth information.

A ToF camera may generate control signals having L different phases. The ToF camera may be configured by an L-phase and M-tap scheme to include M electric charge quantity storage spaces. Here, L and M denote natural numbers. For example, in an example of a 4-phase and 1-tap scheme, the ToF camera may generate four control signals '$C_1$', '$C_2$', '$C_3$', and '$C_4$' having a phase difference of 90 degrees from each other.

The sensor unit 120 may obtain a quantity '$Q_1$' of electric charges using the control signal '$C_1$' and the reflected light signal, a quantity '$Q_2$' of electric charges using the control signal '$C_2$' and the reflected light signal, a quantity '$Q_3$' of electric charges using the control signal '$C_3$' and the reflected light signal, and a quantity '$Q_4$' of electric charges using the control signal '$C_4$' and the reflected light signal, sequentially.

The 4-phase and 1-tap scheme of FIG. 4, a 4-phase and 2-tap scheme of FIG. 5, and a 4-phase and 4-tap scheme may indicate different structures of the ToF camera. For example, the sensor unit 120 may employ different methods of obtaining a phase difference between the reflected light signal and the control signals during an integration time, depending on the structures of the ToF camera.

Although it is described that four control signals are generated and four quantities of electric charges are obtained with respect to FIGS. 4 through 6, a number of control signals may be less than or greater than four depending on example embodiments.

The blur determining unit 130 may determine whether a blur occurs in an image acquired through the ToF camera, based on a relationship among the obtained quantities '$Q_1$', '$Q_2$', '$Q_3$', and '$Q_4$' of electric charges. For example, the blur determining unit 130 may calculate a first difference value ($Q_1$-$Q_2$) corresponding to a difference between quantities of electric charges obtained while the control signals $C_1$ and $C_2$ have high values. In addition, the blur determining unit 130 may calculate a second difference value ($Q_3$-$Q_4$) corresponding to a difference between quantities of electric charges obtained while the control signals $C_3$ and $C_4$ have high values. The blur determining unit 130 may calculate the depth information $t_d$ by applying an arctangent function to a value ($Q_3$-$Q_4$/$Q_1$-$Q_2$) obtained by dividing the second difference value ($Q_3$-$Q_4$) by the first difference value ($Q_1$-$Q_2$).

For example, in an example of the 4-phase and 2-tap scheme of FIG. 5, it may be assumed that timing diagrams of the control signals $C_1$, $C_2$, $C_3$, and $C_4$ indicate a single cycle for obtaining the quantities $Q_1$, $Q_2$, $Q_3$, and $Q_4$ of electric charges. In this instance, when such a cycle is repeated n number of times, each of the quantities $Q_1$, $Q_2$, $Q_3$, and $Q_4$ of electric charges may be obtained n number of times. Here, n denotes a natural number. When a sheet of depth image is generated using the quantities of electric charges obtained for n cycles, the first difference value described above may correspond to $nQ_1$-$nQ_2$, and the second difference value may correspond to $nQ_3$-$nQ_4$. In addition, depth information $t_d$ of a single pixel may be expressed by Equation 1.

$$t_d = \arctan\left(\frac{nQ_3 - nQ_4}{nQ_1 - nQ_2}\right) \quad \text{[Equation 1]}$$

When a camera, a subject, or a background moves, a phase of a reflected light signal sensed by at least one of pixels included in the sensor unit 120 may change.

Figure 7:
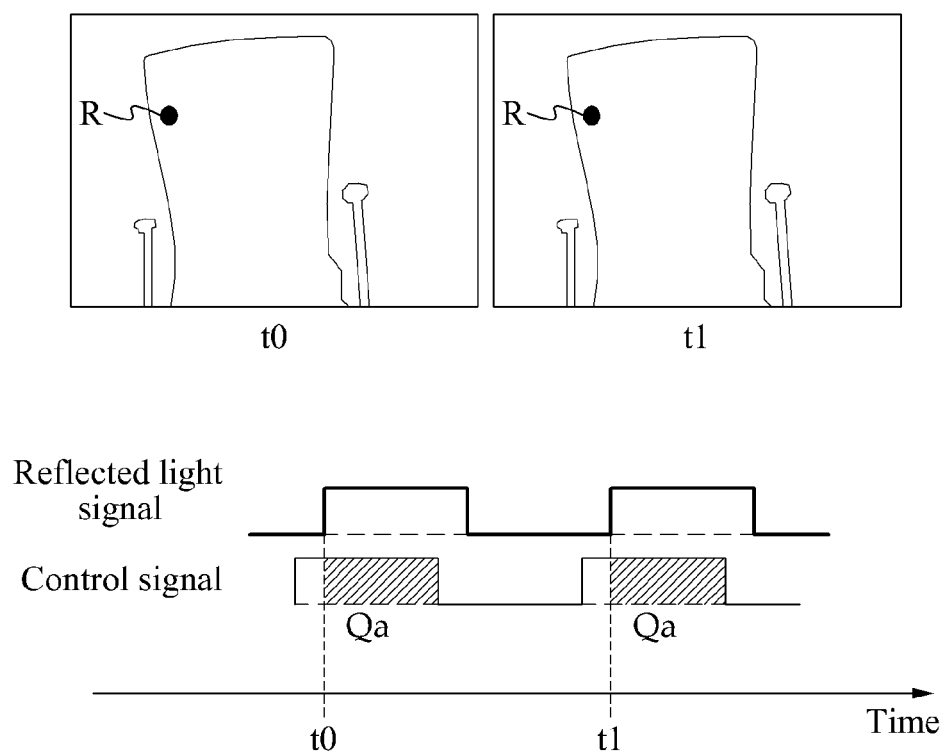
FIGS. 7 and 8 are diagrams illustrating relationships between a reflected light signal and a control signal according to example embodiments.
Figure 8:
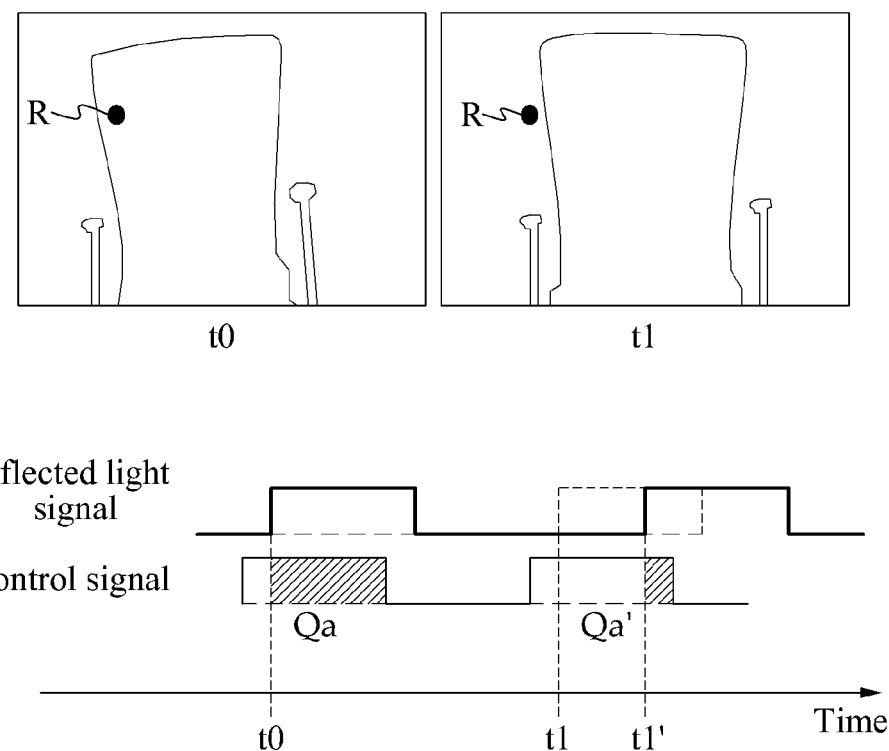

FIGS. 7 and 8 are diagrams illustrating relationships between a reflected light signal and a control signal for a stationary subject and a moving subject, respectively, according to example embodiments. FIGS. 7 and 8 are conceptual diagrams provided only for each of understanding and thus, other example embodiments should not be construed as being limited to FIGS. 7 and 8.

In FIGS. 7 and 8, a reflected light signal may be reflected from a corresponding point R, and a control signal may control a pixel of the sensor unit 120 that senses the reflected light signal of the corresponding point R.

As shown in FIG. 7, in a case of a stationary subject, each of a quantity of electric charges generated at a first high value of the control signal, and a quantity of electric charges generated at a second high value of the control signal may correspond to Qa, equally.

Conversely, as shown in FIG. 8, when an object from which a reflected light signal is reflected changes from a chair to a background, due to a movement of a subject (refer to a point R at a point in time t0 and a point R at a point in time t1), a time at which the reflected light signal reaches a pixel of the sensor unit 120 may be postponed from t1 to t1'.

For example, a phase of the reflected light signal sensed by the pixel may change. In this instance, a quantity of electric charges generated at a first high value of the control signal, and a quantity of electric charges generated at a second high value of the control signal may differ from each other. In particular, the first high value and the second high value may correspond to Qa and Qa', respectively. When a depth value is determined using electric charges generated while the control signal has a high value at two instances, Qa and Qa' may be used to indicate a value of a single pixel corresponding to the point R in a depth image and thus, a blur may occur at the corresponding pixel.

Hereinafter, a depth value that may be obtained from a pixel corresponding to a point at which a movement occurs, in a case of the 4-phase and 2-tap scheme of FIG. 5, will be described.

Before a phase of the reflected light signal changes, among the control signals $C_1$ and $C_2$ for n cycles, the blur determining unit 130 may calculate a first difference value $(Q_1-Q_2)$ corresponding to a difference value in quantity of electric charges between the control signal $C_1$ and the control signal $C_2$ for m cycles, and a first difference value $(\hat{Q}_1-\hat{Q}_2)$ corresponding to a difference value in quantity of electric charges between the control signal $C_1$ and the control signal $C_2$ for remaining n−m cycles during which the control signals $C_1$ and $C_2$ have new phases due to the change in the phase difference. In addition, before a phase difference of the reflected light signal changes, among the control signals $C_3$ and $C_4$ for n cycles, the blur determining unit 130 may calculate a second difference value $(Q_3-Q_4)$ corresponding to a difference value in quantities of electric charges between the control signal $C_3$ and the control signal $C_4$ for m cycles, and a second difference value $(\hat{Q}_3-\hat{Q}_4)$ corresponding to a difference value in quantities of electric charges between the control signal $C_3$ and the control signal $C_4$ for remaining n−m cycles during which the control signals $C_3$ and $C_4$ have new phases due to the change in the phase difference.

In this instance, the depth information $t_d$ may be expressed by Equation 2.

$$t_d(m) = \arctan\left(\frac{n\overline{Q_3} - n\overline{Q_4}}{(mQ_1 + (n-m)\overline{Q_1}) - (mQ_2 + (n-m)\overline{Q_2})}\right)$$
$$= \arctan\left(\frac{n\overline{Q_3} - n\overline{Q_4}}{m(Q_1 - \overline{Q_1} - Q_2 + \overline{Q_2}) + n(\overline{Q_1} - \overline{Q_2})}\right)$$
[Equation 2]

The function $t_d$ with a variable m may be primarily differentiated to be a function $t_d'$, as expressed by Equation 3.

$$t_d'(m) = \frac{1}{1 + \left(\frac{n\overline{Q_3} - n\overline{Q_4}}{m(Q_1 - \overline{Q_1} - Q_2 + \overline{Q_2}) + n(\overline{Q_1} - \overline{Q_2})}\right)^2}$$
$$= \frac{(m(Q_1 - \overline{Q_1} - Q_2 + \overline{Q_2}) + n(\overline{Q_1} - \overline{Q_2}))^2}{(n\overline{Q_3} - n\overline{Q_4})^2 + (m(Q_1 - \overline{Q_1} - Q_2 + \overline{Q_2}) + n(\overline{Q_1} - \overline{Q_2}))^2} = 0$$
[Equation 3]

Solving Equation 3, a value expressed by Equation 4 may be obtained.

$$m = n\frac{(\overline{Q_2} - \overline{Q_1})}{(Q_1 - \overline{Q_1} - Q_2 + \overline{Q_2})}$$
[Equation 4]

For example, it may be understood that a change in the depth information $t_d$ caused by the change in the phase difference may have a single local maximum value or a single local minimum value for the m cycles obtained. In this instance, a location of the m cycles may change based on depth information after and before the movement occurs.

According to the description provided above, a blur phenomenon in an image generated by the ToF camera may not have an intermediate value of both end values, or may not occur in a form of a monotone increase or monotone decrease. Since the ToF camera may obtain an image by a scheme differing from a scheme of a color camera due to characteristics of the ToF camera, a method of deblurring a blur in the image generated by the ToF camera may be entirely different from a deblurring method of the color camera.

As an example, the blur determining unit 130 may calculate, an n number of times, a first difference value between quantities '$Q_1$' and '$Q_2$' of electric charges obtained through the control signals $C_1$ and $C_2$, and a second difference value between quantities '$Q_3$' and '$Q_4$' of electric charges obtained through the control signals $C_3$ and $C_4$, and may calculate depth information an n number of times, based on a result of calculating the first difference value and the second difference value. For example, the blur determining unit 130 may calculate depth information based on quantities of electric charges obtained for every single cycle of a control signal. A single frame of a depth image may be generated using an average value of n pieces of depth information calculated by the foregoing manner.

In this instance, the blur determining unit 130 may determine that a blur occurs in the depth image when at least one of the n pieces of depth information calculated is not flat. For example, when the reflected light signal has a constant phase, the n pieces of depth information calculated may have constant values. Conversely, when the reflected light signal has an inconstant value, the n pieces of depth information calculated may fail to have constant values, and may be calculated to inconstant values. Accordingly, the blur determining unit 130 may determine that a blur occurs in an area having an inconstant value in the image.

Figure 9:
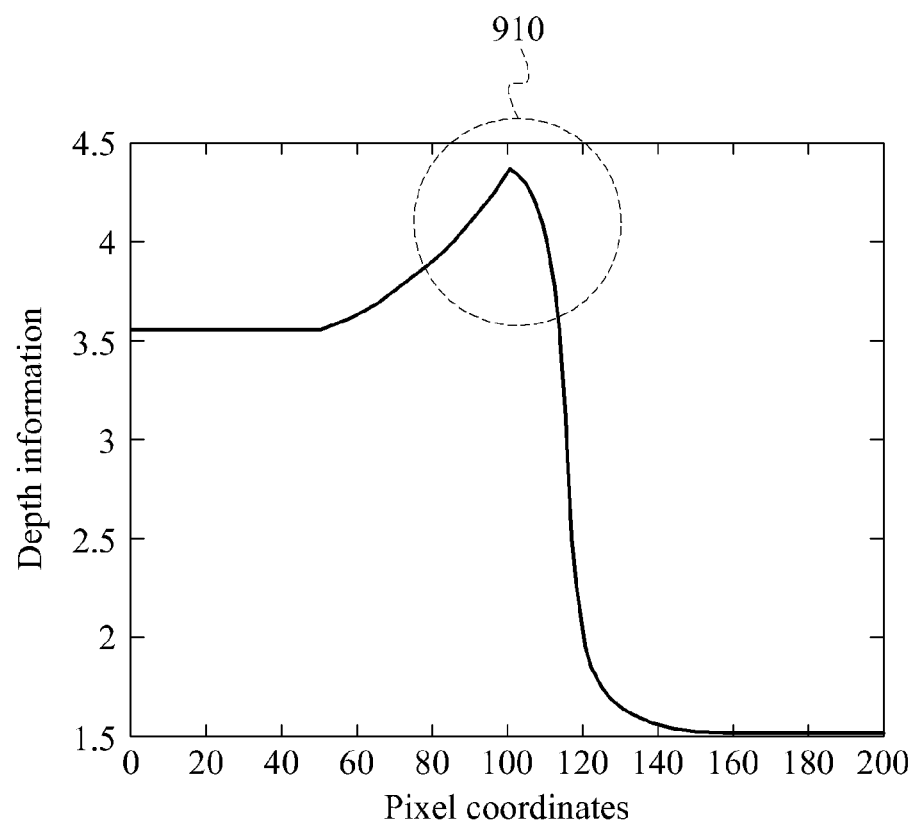
FIG. 9 is a graph illustrating depth information of a blurred area in which a blur occurs in an image according to example embodiments.

FIG. 9 is a graph illustrating depth information of a blurred area in which a blur occurs in an image according to example embodiments.

The blur determining unit 130 may determine whether a blur occurs, based on depth information of a moving object. For example, the blur determining unit 130 may determine that a blur occurs in an area in which depth information associated with coordinates of each pixel, that is, a pixel value, has an inconsistent value.

Referring to FIG. 9, when depth information has a relatively great value in a predetermined area, unlike another piece of depth information, the blur determining unit 130 may determine the area in which depth information has a value different from a value of the other piece of depth information to be a blurred area 910. For example, as shown in FIG. 9, when a depth information graph appears in a cuspidal form as a result of arranging depth information between pixel coordinates, the blur determining unit 130 may determine that a blur occurs in a pixel area forming a cusp, that is, the blurred area 910.

Figure 10:
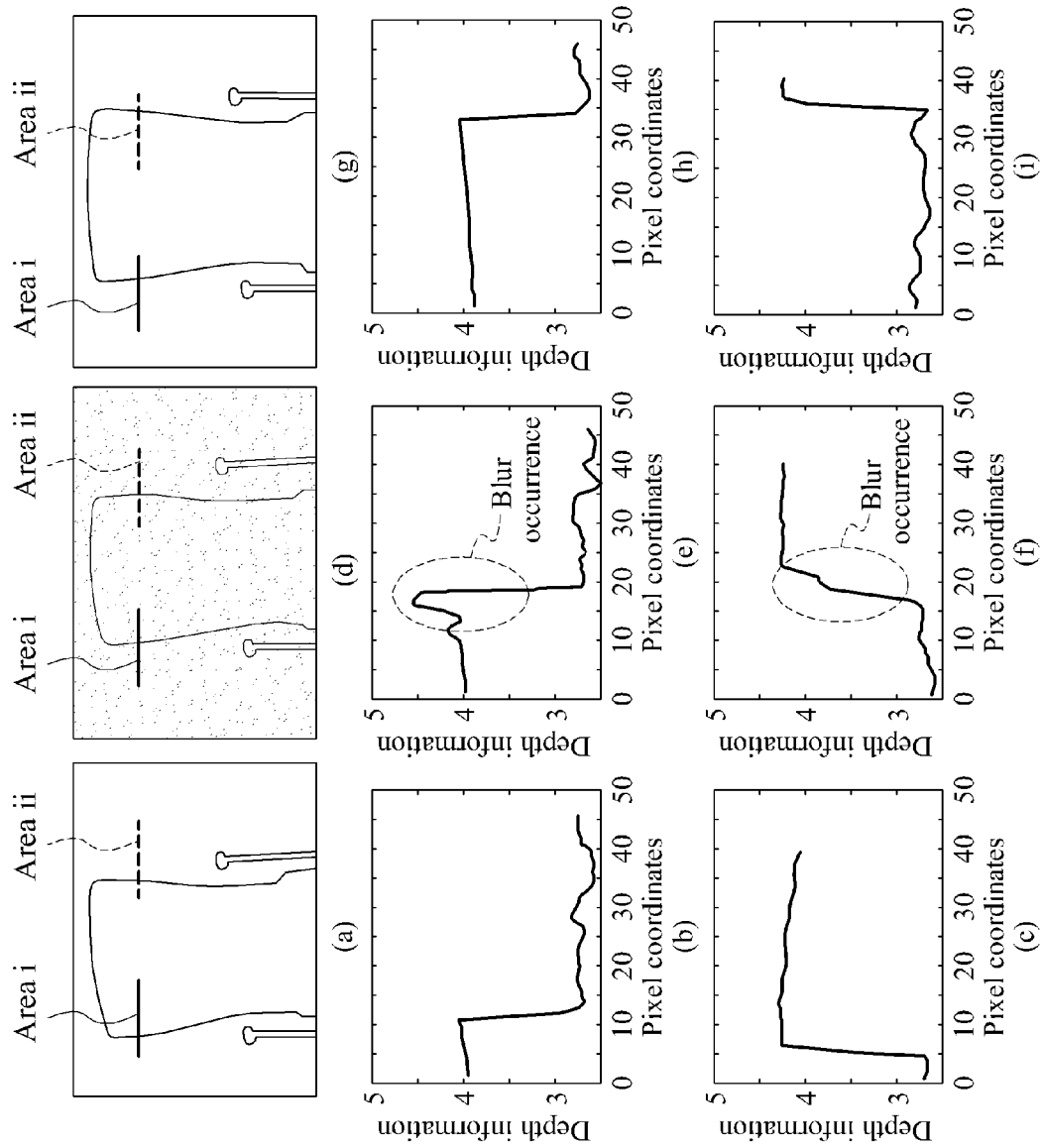
FIG. 10 illustrates an association between an image in which a blur occurs and depth information in parts (a) through (i) according to example embodiments.

FIG. 10 illustrates an association between an image in which a blur occurs and depth information in parts (a) through (i) according to example embodiments.

The blur determining unit 130 may calculate depth information of a predetermined area in each of a first image of part (a) of FIG. 10, a second image of part (d) of FIG. 10, and a third image of part (g) of FIG. 10, and may determine whether a blur occurs in each of the first image, the second image, and the third image, based on the calculated depth information.

For example, parts (b) and (c) of FIG. 10 are graphs indicating depth information calculated with respect to an area i and an area ii of the first image of part (a) of FIG. 10, respectively. Although the depth information calculated from each of the area i and the area ii of the first image of part (a) of FIG. 10 fails to have a perfect, constant value, flat depth information is shown at the entirety of pixel coordinates. In this instance, the blur determining unit 130 may determine that a blur is absent in the first image of part (a) of FIG. 10.

Parts (e) and (f) of FIG. 10 are graphs indicating depth information calculated with respect to an area i and an area ii of the second image of part (d) of FIG. 10 in which a movement occurs, respectively. The depth information calculated from each of the area i and the area ii of the second image of part (d) of FIG. 10 may have a unique depth information value which is not observed in parts (b) and (c) of FIG. 10 related to the first image of part (a) of FIG. 10 in which a movement is absent. Here, the unique value may appear in a cuspidal form, as a sharp change in a gradient, or the like. In this instance, the blur determining unit 130 may determine that a blur occurs in the second image of part (d) of FIG. 10.

Parts (h) and (i) of FIG. 10 are graphs indicating depth information calculated with respect to an area i and an area ii of the third image of part (g) of FIG. 10, respectively. Similar to the depth information of the first image of part (a) of FIG. 10, although the depth information calculated from each of the area i and the area ii of the third image of part (g) of FIG. 10 fails to have a perfect, constant value, flat depth information is shown at the entirety of pixel coordinates. In this instance, the blur determining unit 130 may determine that a blur is absent in the third image of part (g) of FIG. 10.

Figure 11:
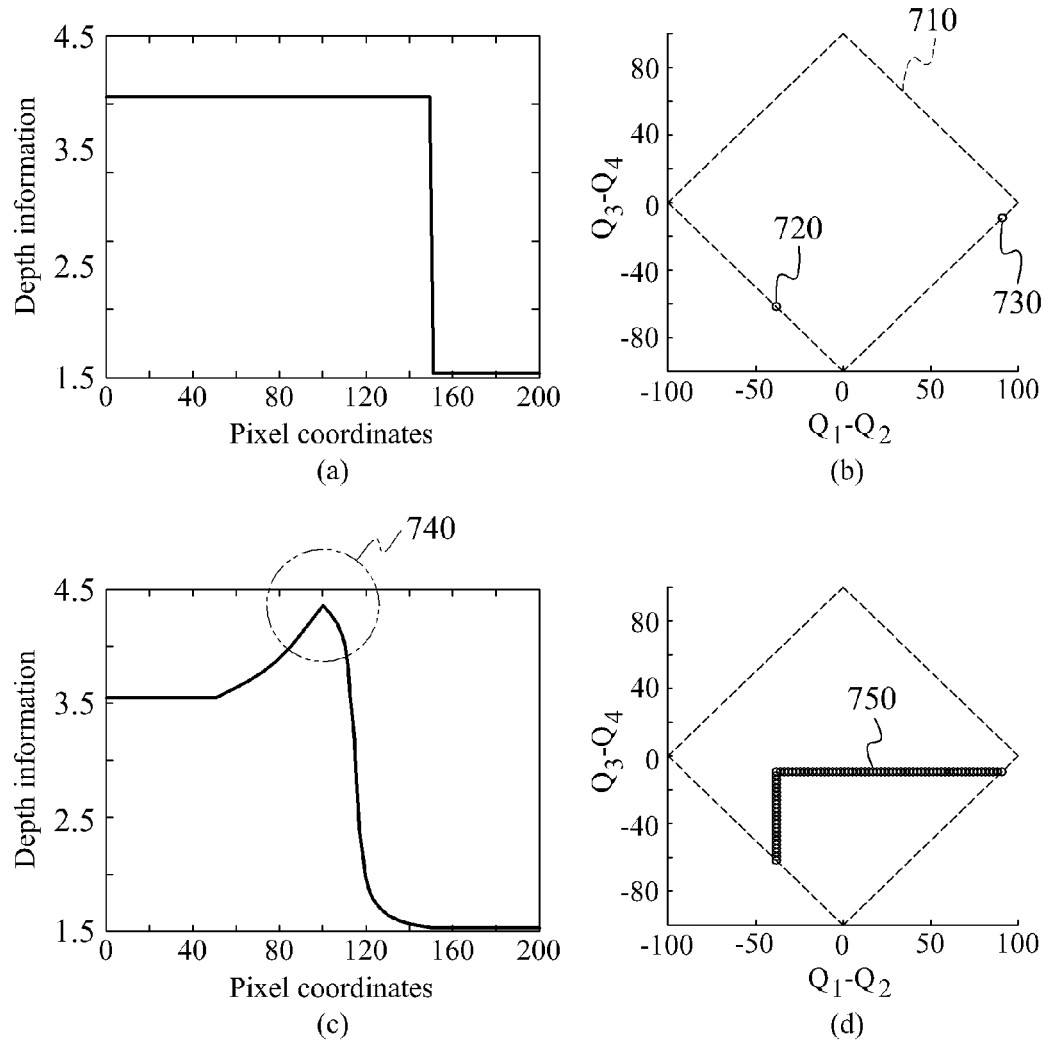
FIG. 11 illustrates an association between depth information and a blur model in parts (a) through (d) according to example embodiments.

FIG. 11 illustrates an association between depth information and a blur model in parts (a) through (d) according to example embodiments.

In a case of a ToF camera with a 4-phase and 2-tap structure, among quantities $Q_1$, $Q_2$, $Q_3$, and $Q_4$ of electric charges obtained through a reflected light signal, and control signals $C_1$, $C_2$, $C_3$, and $C_4$, a relationship between $Q_1-Q_2$ and $Q_3-Q_4$ may appear in a form of a diamond as shown in part (b) of FIG. 11. For example, when a subject, a camera, a background, and the like are stationary, the relationship between the quantity $Q_1-Q_2$ of electric charges and a quantity $Q_3-Q_4$ of electric charges may exist on a diamond 710, as shown in part (b) of FIG. 11. A difference between $n(Q_1-Q_2)$ and $n(Q_3-Q_4)$, corresponding to a difference between quantities of electric charges obtained for n cycles of each control signal, may appear in a form similar to the diamond 710 of part (b) of FIG. 11. In addition, a size and a shape of the diamond may vary depending on example embodiments. Part (a) of FIG. 11 illustrates a state in which a blur caused by a movement is absent, and a relationship between quantities of electric charges used for calculating depth information for each pixel may correspond to two coordinates 720 and 730 of part (b) of FIG. 11.

Conversely, part (c) of FIG. 11 illustrates a graph including an inconstant value 740 due to a blur. In this instance, a relationship among $Q_1$, $Q_2$, $Q_3$, and $Q_4$ may be displayed in an area 750 deviating from the diamond, as shown in part (d) of FIG. 11. For example, when comparing a graph of part (d) of FIG. 11 obtained from an image in which a blur occurs to the graph of part (b) of FIG. 11 obtained from an image in which a blur is absent, it may be understood that a value to be illustrated in an area, apart from a location of the diamond, may occur.

The blur processing apparatus 100 may store, in advance, reference electric charge quantity relationship information indicating a relationship between quantities of electric charges integrated by a reflected light signal and control signals, in a case in which a subject, a camera, a background, and the like are stationary, for example, a case in which a blur caused by a movement is absent.

An example of the reference electric charge quantity relationship information may correspond to the diamond-shaped graph of part (b) of FIG. 11, and the reference electric charge quantity relationship information may be expressed by graphs of various shapes depending on example embodiments. In addition, the reference electric charge quantity relationship information may be expressed in various forms, for example, a table, an equation, and the like, in addition to a graph. The blur determining unit 130 may compare a relationship between quantities of electric charges integrated by a reflected light signal and control signals while photographing a subject to the reference electric charge quantity relationship information stored in advance. Based on a result of the comparing, the blur determining unit 130 may determine whether a blur occurs. For example, when a relationship between electric charges obtained based on control signals at a predetermined pixel while photographing is out of a range of the reference electron charge quantity relationship information, the blur determining unit 130 may determine that a blur occurs in the corresponding pixel.

For example, in a case of a ToF camera with a 4-phase and 2-tap structure, the blur determining unit 130 may determine, for each pixel, whether a relationship between quantities of electric charges of control signals, that is, a relationship between $Q_1-Q_2$ and $Q_3-Q_4$ is out of a normal range, for example points on the diamond shape, thereby determining whether a blur occurs.

In each case of ToF cameras with an L-phase and M-tap structure, the blur determining unit 130 may determine whether each relationship among quantities $Q_1$ to through $Q_N$ defined based on a predetermined phase difference between control signals is out of a normal range, thereby instantly determining whether a blur occurs, during a process of calculating depth information of each pixel of the ToF camera.

When a blur occurs as a result of the determining, the image processing unit 140 may deblur the blur, based on a value of a normal pixel adjacent to a blurred area in which the blur occurs in the image.

For example, the image processing unit 140 may deblur the blur, by replacing a value of a pixel in which the blur occurs in the image with a value of a normal adjacent pixel in which the blur is absent. In particular, the image processing unit 140 may replace depth information of the blurred area in which the blur occurs with a depth value of a pixel located closest to the blurred area, among normal adjacent pixels in which the blur is absent. In addition, the image processing unit 140 may replace the depth information of the blurred area in which the blur occurs with the value of the normal adjacent pixel in which the blur is absent, based on a neighboring frame present at a time different from a time at which a frame in which the blur occurs is present in the image. For example, the image processing unit 140 may replace a value of a pixel in which a blur occurs in a predetermined frame with a value of a pixel at identical coordinates in a previous frame or a subsequent frame.

The blur determining unit 130 may generate a blur model for each tab structure of a ToF camera. As described above, the ToF camera may be configured in various structures, for example, a 4-phase and 1-tap structure, a 4-phase and 2-tap structure, a 4-phase and 4-tap structure, and the like.

$$t_d(m) = \arctan\left(\frac{n\overline{Q}_3 - n\overline{Q}_4}{(mQ_1 + (n-m)\overline{Q}_1) - n\overline{Q}_2}\right)$$

$$t_d(m) = \arctan\left(\frac{n\overline{Q}_3 - n\overline{Q}_4}{nQ_1 - (mQ_2 + (n-m)\overline{Q}_2)}\right)$$

$$t_d(m) = \arctan\left(\frac{(mQ_3 + (n-m)\overline{Q}_3) - n\overline{Q}_4}{nQ_1 - nQ_2}\right)$$

$$t_d(m) = \arctan\left(\frac{nQ_3 - (mQ_4 + (n-m)\overline{Q}_4)}{nQ_1 - nQ_2}\right)$$

[Equation 5]

Equation 5 indicates a blur model of a ToF camera configured in the 4-phase and 1-tap structure.

$$t_d(m) = \arctan\left(\frac{n\overline{Q}_3 - n\overline{Q}_4}{(mQ_1 + (n-m)\overline{Q}_1) - (mQ_2 + (n-m)\overline{Q}_2)}\right)$$

$$t_d(m) = \arctan\left(\frac{(mQ_3 + (n-m)\overline{Q}_3) - (mQ_4 + (n-m)\overline{Q}_4)}{nQ_1 - nQ_2}\right)$$

[Equation 6]

Equation 6 indicates a blur model of a ToF camera configured in the 4-phase and 2-tap structure. In Equation 6, the blur determining unit 130 may determine whether a relationship between reflected light signals is identical to a sum $(Q_1+Q_2)$ of quantities of electric charges between $C_1$ and $C_2$ for m cycles, and a sum $(Q_3+Q_4)$ of to quantities of electric charges between $C_3$ and $C_4$ for m cycles, for example, whether the relationship between the reflected light signals satisfies the condition of $(Q_1+Q_2)=(Q_3+Q_4)$, thereby determining whether a blur occurs in an image.

For example, when the relationship between the reflected light signals obtained satisfies the condition of $Q_1+Q_2=Q_3+Q_4$, the blur determining unit 130 may determine that the blur is absent in the image. When the relationship between the reflected light signals acquired fails to satisfy the condition of $Q_1+Q_2=Q_3+Q_4$, the blur determining unit 130 may determine that the blur occurs in the image.

$$t_d(m) = \arctan\left(\frac{(mQ_3 + (n-m)\overline{Q}_3) - (mQ_4 + (n-m)\overline{Q}_4)}{(mQ_1 + (n-m)\overline{Q}_1) - (mQ_2 + (n-m)\overline{Q}_2)}\right)$$

[Equation 7]

Equation 7 indicates a blur model of a ToF camera configured in the 4-phase and 4-tap structure.

Figure 12:
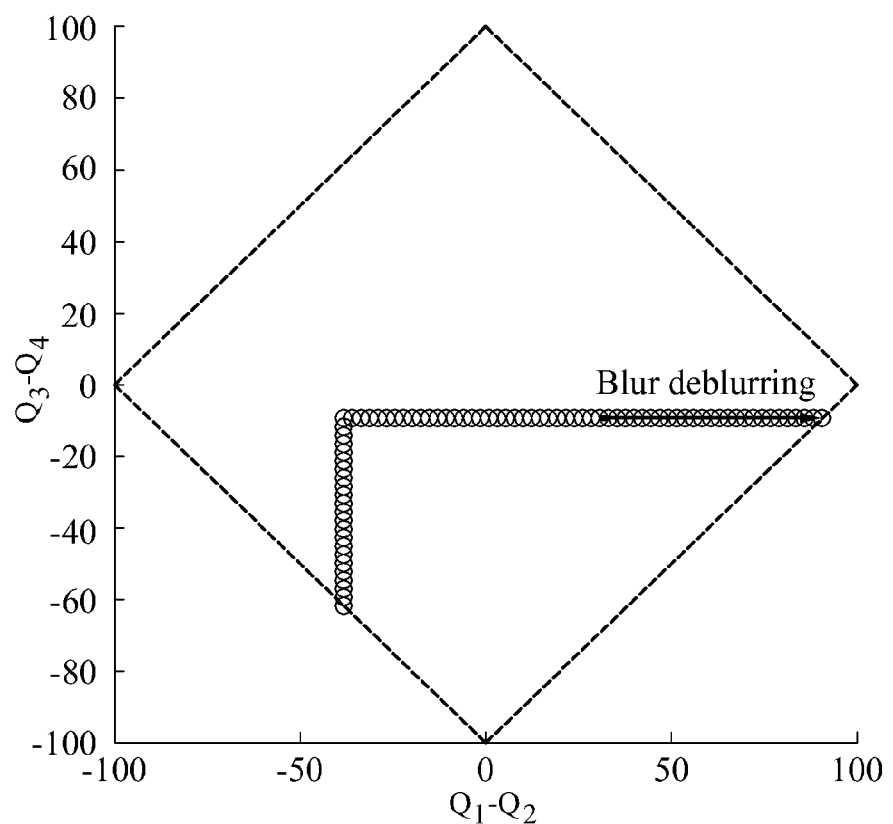
FIG. 12 is a graph illustrating an example of deblurring a blur in an image according to example embodiments.

FIG. 12 is a graph illustrating an example of deblurring a blur in an image according to example embodiments.

When a blur occurs in an image, the image processing unit 140 may deblur the blur by replacing a value of a pixel in which the blur occurs in the image with a value of a normal adjacent pixel in which the blur is absent.

In FIG. 12, the value of the pixel in which the blur occurs may correspond to a value indicated inside a diamond-shaped graph, and the value of the normal adjacent pixel may correspond to a value indicated on the diamond-shaped graph. For example, the image processing unit 140 may deblur the blur by replacing the value indicated inside the diamond-shaped graph with the value indicated on the diamond-shaped graph.

In particular, the image processing unit 140 may deblur the blur by replacing the value of the pixel in which the blur occurs with depth information of a pixel located closest to the blur, among normal adjacent pixels. In addition, the image processing unit 140 may replace the depth information of the pixel in which the blur occurs with the value of the normal adjacent pixel in which the blur is absent, based on a neighboring frame present at a time different from a time at which a frame in which the blur occurs is present in the image.

Figure 13:
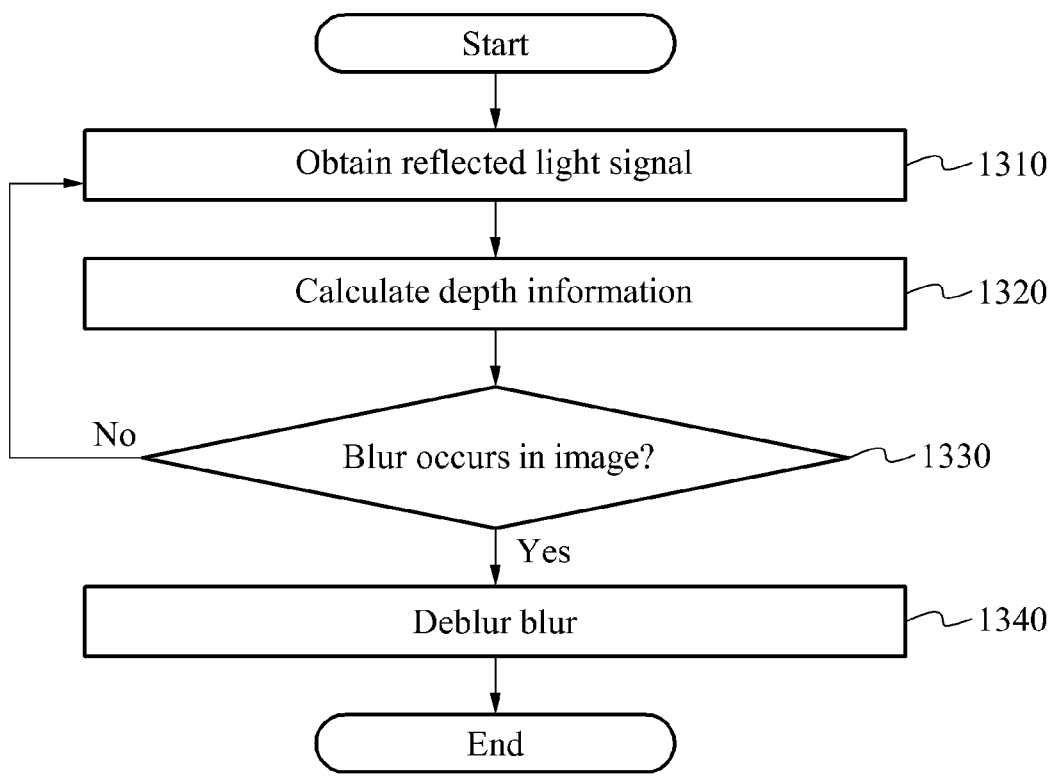
FIG. 13 is a flowchart illustrating a method of processing a blur according to example embodiments.

FIG. 13 is a flowchart illustrating a method of processing a blur according to example embodiments. Here, the blur processing method may be performed by the blur processing apparatus 100 of FIG. 1.

Referring to FIG. 13, in operation 1310, the blur processing apparatus 100 may emit a radiated light signal to the object 104 through the light radiating unit 102, and may obtain a reflected light signal corresponding to the emitted radiated light signal that is reflected from the object 104.

In operation 1320, the blur processing apparatus 100 may calculate depth information based on a phase difference of the obtained reflected light signal.

In operation 1330, the blur processing apparatus 100 may determine whether a blur occurs in an image acquired through a ToF camera, based on the depth information calculated.

The blur processing apparatus 100 may calculate the depth information, by calculating a phase difference between the reflected light signal and control signals having different phases. For example, the blur processing apparatus 100 may obtain quantities of electric charges light-received by the reflected light signal and, each of the control signals having different phases. The blur processing apparatus 100 may determine whether a blur occurs in the acquired image, based on whether a relationship between the obtained quantities of electric charges, and each quantity of electric charges defined by the different phases of the plurality of control signals is out of a normal range.

In operation 1340, the blur processing apparatus 100 may deblur a blur, using a value of a normal pixel adjacent to a blurred area in which the blur occurs in the image, when the blur occurs as a result of operation 1330.

The blur processing apparatus 100 may deblur the blur by replacing a value of a pixel in which the blur occurs in the image with a value of a normal adjacent pixel in which the blur is absent.

In addition, the blur processing apparatus 100 may deblur the blur by replacing depth information of the blurred area in which the blur occurs with the value of the normal adjacent pixel in which the blur is absent, based on a neighboring frame present at a time different from a time at which a frame in which the blur occurs is present in the image.

Figure 14:
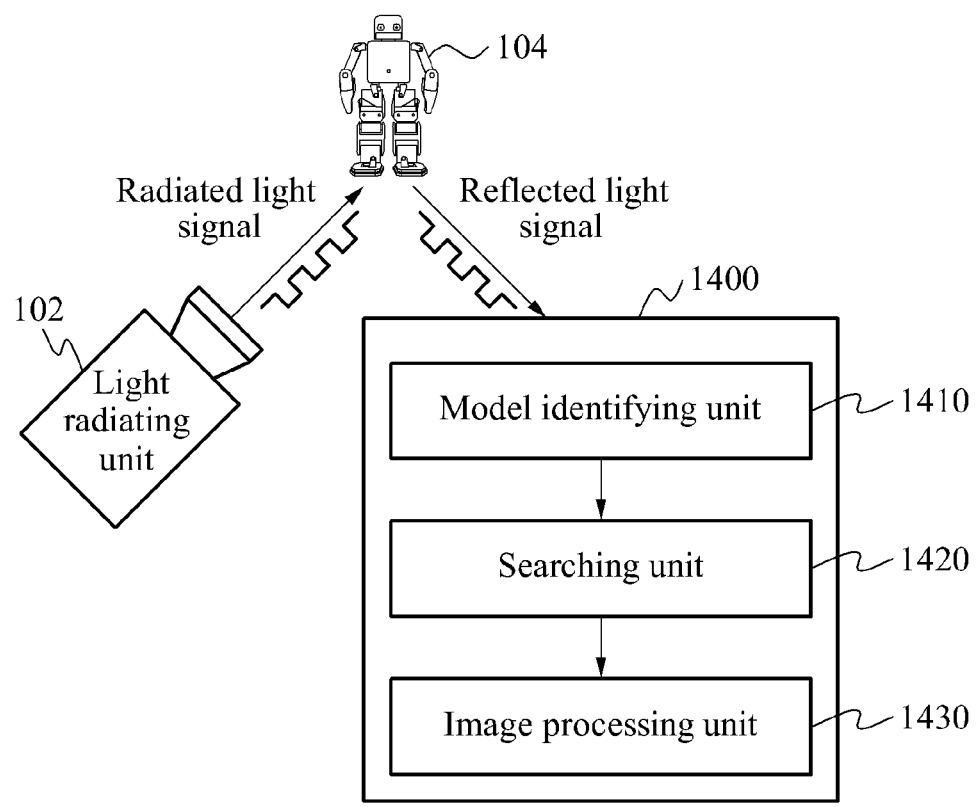
FIG. 14 is a block diagram illustrating an apparatus for processing a blur according to other example embodiments.

FIG. 14 is a block diagram illustrating an apparatus for processing a blur according to other example embodiments.

Referring to FIG. 14, a blur processing apparatus 1400 may include a model identifying unit 1410, a searching unit 1420, and an image processing unit 1430. For example, the blur processing apparatus 1400 may be used to deblur a blur in an image in a case in which a reflected light signal, and quantities $Q_1$, $Q_2$, $Q_3$, and $Q_4$ of electric charges of control signals are not provided.

The model identifying unit 1410 may identify a blur model corresponding to a structure of a ToF camera. The ToF camera may be configured by an L-phase and M-tap scheme to include control signals having L different phases generated by various schemes, and M electric charge quantity storage spaces. Here, L and M denote natural numbers. Accordingly, the blur model may vary depending on structures of the ToF camera, for example, a 4-phase and 1-tap structure, a 4-phase and 2-tap structure, a 4-phase and 4-tap structure, and the like.

The searching unit 1420 may search for a pattern associated with the blur model in an image acquired through the ToF camera. The searching unit 1420 may search for the pattern associated with the blur model, using various pattern search schemes. The searching unit 1420 may employ a pyramid type progressive search scheme in an orientation and a space, in order to improve a search rate.

In particular, the search unit 1420 may search for a pattern using the Hough transformation, and may search for the pattern in an R-Theta space.

The image processing unit 1430 may deblur a blur in the image, by filtering a blurred area in a found pattern. The image processing unit 1430 may perform filtering in the R-Theta space, in order to remove noise in the blurred area. In this instance, different weight parameters may be applied to R and Theta in order to enable a Euclidean distance to be valid in the R-Theta space.

Figure 15:
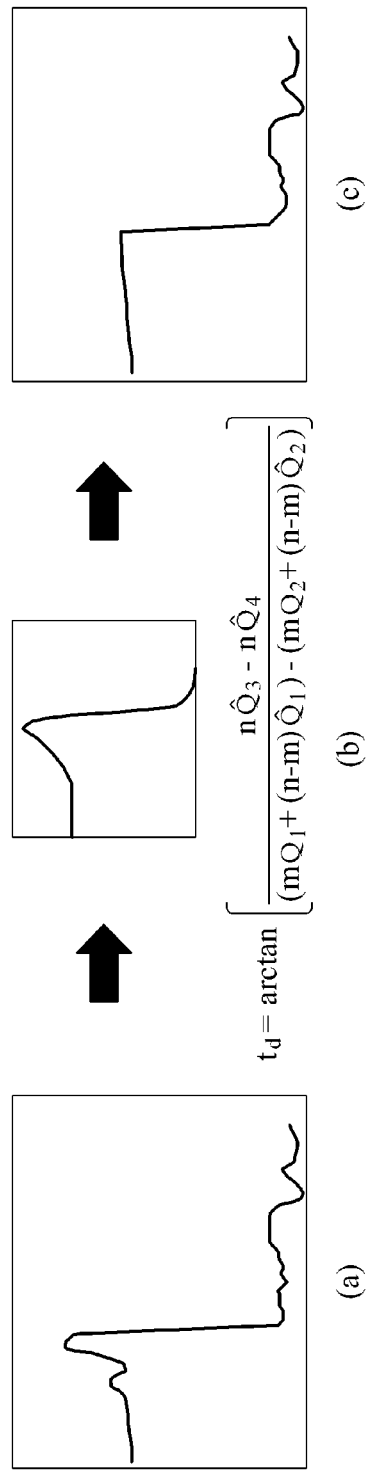
FIG. 15 illustrates an example of filtering a blurred area using a blur model in parts (a) through (c) according to example embodiments.

FIG. 15 illustrate an example of filtering a blurred area using a blur model in parts (a) through (c) according to example embodiments.

Referring to FIG. 15, the image processing unit 1430 may acquire a deblurred image of part (c), by filtering a blurred area of part (a) in which a blur occurs, using a blur model of part (b).

Figure 16:
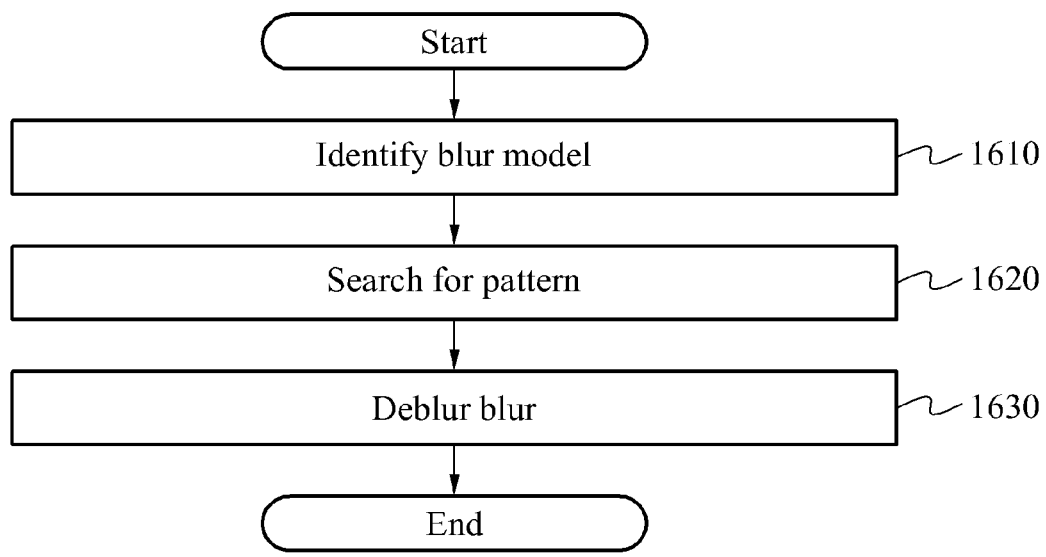
FIG. 16 is a flowchart illustrating a method of processing a blur according to other example embodiments.

FIG. 16 is a flowchart illustrating a method of processing a blur according to other example embodiments. Here, the blur processing method may be performed by the blur processing apparatus 1400 of FIG. 14.

Referring to FIG. 16, in operation 1610, the blur processing apparatus 1400 may identify a blur model corresponding to a structure of a ToF camera. The ToF camera may be configured by an L-phase and M-tap scheme to include control signals having L different phases generated by various schemes, and M electric charge quantity storage spaces. Here, L and M denote natural numbers. Accordingly, the blur model may vary depending on structures of the ToF camera, for example, a 4-phase and 1-tap structure, a 4-phase and 2-tap structure, a 4-phase and 4-tap structure, and the like.

In operation 1620, the blur processing apparatus 1400 may search for a pattern associated with the blur model in an image acquired through the ToF camera. The blur processing apparatus 1400 may search for the pattern associated with the blur model, using various pattern search schemes. The blur processing apparatus 1400 may employ a pyramid type progressive search scheme in an orientation and a space, thereby improving a search rate.

In operation 1630, the blur processing apparatus 1400 may deblur a blur in the image, by filtering a blurred area in which a blur occurs in a found pattern. The blur processing apparatus 1400 may perform filtering in an R-Theta space, in order to remove noise in the blurred area.

Example embodiments may be recorded in computer-readable media including program instructions to implement various operations embodied by a computer. The media may also include, alone or in combination with the program instructions, data files, data structures, and the like. The program instructions stored in the media may be specially designed and configured for the example embodiments, or may be known to those skilled in the art and thereby be implemented.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. An apparatus for processing a blur, the apparatus comprising:
   a light sensor configured to integrate, based on a plurality of control signals, electrons generated by a reflected light signal corresponding to a light signal radiated toward and returned from an object; and
   a processor configured to,
      generate the plurality of control signals, each of the plurality of control signals having different phases and controlling a timing for integrating the electrons, and
      determine whether a blur occurs based on a relationship between quantities of the electrons integrated for each of the plurality of control signals.

2. The apparatus of claim 1, wherein the processor is configured to determine whether the blur occurs, by comparing the relationship between the quantities of the integrated electrons to a reference electric charge quantity relationship information indicating a case in which a blur is absent.

3. The apparatus of claim 1, wherein, the processor is configured to determine whether the blur occurs in an image acquired through a Time of Flight (TOF) camera, based on a phase difference of the reflected light signal when the radiated light signal is emitted through the Time of Flight (ToF) camera.

4. The apparatus of claim 3, wherein the processor is configured to determine depth information by calculating a phase difference between the reflected light signal and the plurality of control signals having different phases.

5. The apparatus of claim 3, wherein
   the light sensor is configured to obtain a quantity of electric charges received by the reflected light signal, and
   the processor is configured to determine whether the blur occurs in the acquired image, based on whether a relationship between the obtained quantity of electric charges, and each quantity of electric charges defined by the different phases of the plurality of control signals is out of a range.

6. The apparatus of claim 3, wherein
   the light sensor is configured to obtain n reflected light signals, and the processor is configured to,
- determine n pieces of depth information by determining a phase difference between the plurality of control signals and each of the n reflected light signals, and
- determine an average value of the determined n pieces of depth information,
- wherein n denotes a natural number.

7. The apparatus of claim 6, wherein the processor is configured to determine that the blur occurs in the image when at least one of the n pieces of depth information determined is not flat.

8. The apparatus of claim 1, wherein the processor is configured to deblur the blur in an image acquired through a Time of Flight (ToF) camera, by replacing a value of a pixel in which the blur occurs with a value of a normal adjacent pixel in which the blur is absent.

9. The apparatus of claim 8, wherein the processor is configured to replace depth information of a blurred area in which the blur occurs with the value of the normal adjacent pixel in which the blur is absent, based on a neighboring frame present at a time different from a time at which a frame in which the blur occurs is present in the image.

10. The apparatus of claim 1, wherein the processor is further configured to,
- identify a blur model corresponding to a structure of a Time of Flight (ToF) camera,
- search for a pattern associated with the blur model in an image acquired through the ToF camera, and
- deblur the blur in the acquired image by filtering a blurred area in the pattern found during the search.

11. The apparatus of claim 10, wherein the processor is configured to filter the blurred area in an R-Theta space.

12. A method of processing a blur, the method comprising:
- generating a plurality of control signals, each of the plurality of control signals having different phases and controlling a timing for integrating the electrons;
- integrating, based on the plurality of control signals generated, electrons generated by a reflected light signal corresponding to a light signal radiated toward and returned from an object; and
- determining whether the blur occurs, based on a relationship between quantities of the electrons integrated for each of the plurality of control signals.

13. The method of claim 12, wherein the determining comprises comparing the relationship between the quantities of the integrated electrons to a reference electric charge quantity relationship information indicating a case in which a blur is absent.

14. The method of claim 12, wherein, the determining comprises determining whether the blur occurs in an image acquired through a Time of Flight (ToF) camera based on a phase difference of the reflected light signal when the radiated light signal is emitted through the ToF camera.

15. The method of claim 14, wherein the determining comprises determining depth information based on a phase difference between the reflected light signal and the plurality of control signals having different phases.

16. The method of claim 14, wherein the determining comprises:
- first determining a phase difference between n obtained reflected light signals, and the plurality of control signals having different phases;
- second determining n pieces of depth information, based on a result of the first determining; and
- third determining an average value of the n pieces of depth information determined in second determining,
- wherein n denotes a natural number.

17. The method of claim 12, further comprising:
- deblurring the blur in an image acquired through a Time of Flight (ToF) camera, by replacing a value of a pixel in which the blur occurs with a value of a normal adjacent pixel in which the blur is absent.

18. The method of claim 17, wherein the deblurring deblurs the blur by replacing depth information of a blurred area in which the blur occurs with the value of the normal adjacent pixel in which the blur is absent, based on a neighboring frame present at a time different from a time at which a frame in which the blur occurs is present in the image.

19. The method of claim 12, further comprising:
- identifying a blur model corresponding to a structure of a Time of Flight (ToF) camera;
- searching for a pattern associated with the blur model in an image acquired through the ToF camera;
- filtering a blurred area in which the blur occurs in a found pattern; and
- deblurring the blur in the image in which the blurred area is filtered.

20. The method of claim 19, wherein the filtering filters the blurred area in an R-Theta space.

* * * * *